US008844660B2

(12) United States Patent
Kawashima et al.

(10) Patent No.: US 8,844,660 B2
(45) Date of Patent: Sep. 30, 2014

(54) HYBRID WORKING MACHINE

(75) Inventors: Koji Kawashima, Kanagawa (JP);
Makoto Yanagisawa, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 344 days.

(21) Appl. No.: 13/311,709

(22) Filed: Dec. 6, 2011

(65) Prior Publication Data
US 2012/0144819 A1 Jun. 14, 2012

(30) Foreign Application Priority Data

Dec. 9, 2010 (JP) ................... 2010-274861

(51) Int. Cl.
*F15B 1/027* (2006.01)
*F16H 61/4043* (2010.01)
*E02F 9/20* (2006.01)
*B60K 6/485* (2007.10)
*B60W 10/26* (2006.01)
*B60W 20/00* (2006.01)
*E02F 9/22* (2006.01)
*B60W 10/30* (2006.01)
*F16H 61/4148* (2010.01)

(52) U.S. Cl.
CPC ............ *B60K 6/485* (2013.01); *F16H 61/4043* (2013.01); *E02F 9/2075* (2013.01); *F16H 61/4148* (2013.01); *B60Y 2200/412* (2013.01); *Y02T 10/6226* (2013.01); *B60W 10/26* (2013.01); *B60Y 2400/114* (2013.01); *B60W 20/106* (2013.01); *E02F 9/2091* (2013.01); *E02F 9/2217* (2013.01); *B60W 10/30* (2013.01); *Y10S 903/93* (2013.01)
USPC .................. 180/65.29; 180/305; 903/930

(58) Field of Classification Search
CPC ........... F15B 1/027; F15B 1/033; B60K 1/04; B60K 17/356

USPC ................. 180/65.21, 65.265, 65.285, 65.29, 180/65.31, 305, 306, 308; 903/903, 930; 320/137, 138, 162
See application file for complete search history.

(56) References Cited

U.S. PATENT DOCUMENTS 5,540,299 A * 7/1996 Tohda et al. ................... 180/243
6,635,973 B1 * 10/2003 Kagoshima et al. ......... 307/10.1
(Continued)

FOREIGN PATENT DOCUMENTS

JP   2001-043902   2/2001
JP   2005-218285   8/2005
(Continued)

OTHER PUBLICATIONS

Extended European Search Report Dated Dec. 16, 2013.

*Primary Examiner* — John Walters
*Assistant Examiner* — Brian Swenson
(74) *Attorney, Agent, or Firm* — IPUSA, PLLC

(57) ABSTRACT

A hybrid working machine includes an engine, an assist motor configured to assist the engine, a hydraulic pump driven by the engine, an electric power accumulating unit configured to feed the assist motor with electric power, an electric-discharge electric motor configured to perform power running with electric power of an electric power accumulator of the electric power accumulating unit, an electric-discharge hydraulic motor connected to the electric-discharge electric motor, and a hydraulic circuit configured to control driving of the electric-discharge hydraulic motor. The hydraulic circuit includes a circulation circuit configured to be connected to a hydraulic feed port and a hydraulic discharge port of the electric-discharge hydraulic motor and a selector valve configured to perform such switching as to connect the electric-discharge hydraulic motor to the circulation circuit at a time of performing an electric discharge operation.

7 Claims, 9 Drawing Sheets

(56) References Cited

U.S. PATENT DOCUMENTS

| | | | |
|---|---|---|---|
| 6,864,663 B2 * | 3/2005 | Komiyama et al. | 320/104 |
| 7,279,801 B2 * | 10/2007 | Kagoshima | 290/40 C |
| 8,098,039 B2 * | 1/2012 | Endo et al. | 318/701 |
| 8,207,708 B2 * | 6/2012 | Morinaga et al. | 322/14 |
| 8,571,735 B2 * | 10/2013 | Koga et al. | 701/22 |
| 2006/0090462 A1 | 5/2006 | Yoshino | |
| 2008/0314038 A1 | 12/2008 | Tozawa et al. | |
| 2010/0097037 A1 * | 4/2010 | Morinaga et al. | 322/14 |

FOREIGN PATENT DOCUMENTS

| | | |
|---|---|---|
| JP | 2009-261227 | 11/2009 |
| WO | WO2008/111649 | 9/2008 |
| WO | WO2009/125833 | 10/2009 |
| WO | WO2010/058768 | 5/2010 |

* cited by examiner

HYBRID WORKING MACHINE

CROSS-REFERENCE TO RELATED APPLICATION

The present application is based upon and claims the benefit of priority of Japanese Patent Application No. 2010-274861, filed on Dec. 9, 2010, the entire contents of which are incorporated herein by reference.

BACKGROUND OF THE INVENTION

1. Field of the Invention

The present invention relates to hybrid working machines.

2. Description of the Related Art

In general, hybrid working machines such as hybrid shovels include a motor generator for assisting an engine. The motor generator is driven with electric power fed from an electric power accumulating unit including a rechargeable battery or an electric power accumulator. Further, electric power regenerated by a regeneration mechanism is stored in the electric power accumulating unit.

A large-capacity capacitor may be used as the electric power accumulator of the electric power accumulating unit. Such a capacitor has the characteristic of being degraded in an accelerating manner to have a reduced useful service life when repeatedly charged and discharged. Therefore, various techniques have been devised to extend the useful service life of the capacitor.

For example, in view of the fact that the degree of degradation is higher with a higher voltage of the capacitor, it has been proposed to discharge a capacitor at the end of the operation of a working machine so that the voltage of the capacitor becomes lower than or equal to a set voltage. The electric power discharged from the capacitor is accumulated in an electric power accumulating part such as an auxiliary battery.

Further, in order to discharge a capacitor without providing an electric power accumulating part such as an auxiliary battery, it has been proposed to reduce the voltage of the capacitor by consuming electric power by driving a water-cooling pump (an electric motor for a water-cooling pump) with electric power from the capacitor, for example. (See, for example, WO 2009/125833.)

SUMMARY OF THE INVENTION

According to an aspect of the present invention, a hybrid working machine includes an engine; an assist motor configured to assist the engine; a hydraulic pump driven by the engine; an electric power accumulating unit configured to feed the assist motor with electric power; an electric-discharge electric motor configured to perform power running with electric power of an electric power accumulator of the electric power accumulating unit; an electric-discharge hydraulic motor connected to the electric-discharge electric motor; and a hydraulic circuit configured to control driving of the electric-discharge hydraulic motor, the hydraulic circuit including a circulation circuit configured to be connected to a hydraulic feed port and a hydraulic discharge port of the electric-discharge hydraulic motor; and a selector valve configured to perform such switching as to connect the electric-discharge hydraulic motor to the circulation circuit at a time of performing an electric discharge operation.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

As described above, the voltage of the capacitor may be reduced by consuming electric power by driving a water-cooling pump (an electric motor for a water-cooling pump) with electric power from the capacitor. (Such reduction of voltage is referred to as "electric discharge.") In this case, since the water-cooling pump is generally limited in capacity, the amount of electric power consumed by the water-cooling pump is limited, so that it may take time to perform electric discharge. Usually, electric discharge is performed at the time of stopping the operation of a construction machine. Therefore, there is a problem in that if electric discharge takes time, it also takes time before the operation of the construction machine comes to a complete stop. Further, some construction machines with specifications for cold climates do not require water cooling and thus use no water-cooling pump. This prevents electric discharge from being performed.

Therefore, it has been proposed to use an assist motor in place of a water-cooling pump in order to perform electric discharge. In this case, in order to drive the assist motor, it is necessary that an engine to which a main hydraulic pump is mechanically connected have been driven. Accordingly, there are a large number of drive mechanisms to be put into operation, so that there may be a problem in that electric discharge may not be performed if there is a failure in the drive mechanisms. Further, since the engine is kept driven until the end of electric discharge, the engine wastes energy.

According to an aspect of the invention, a technique is provided that allows the electric discharge of a capacitor to be performed in a short period of time using a mechanism with a limited number of driven parts.

A description is given below, with reference to the accompanying drawings, of embodiments of the present invention.

Figure 1:
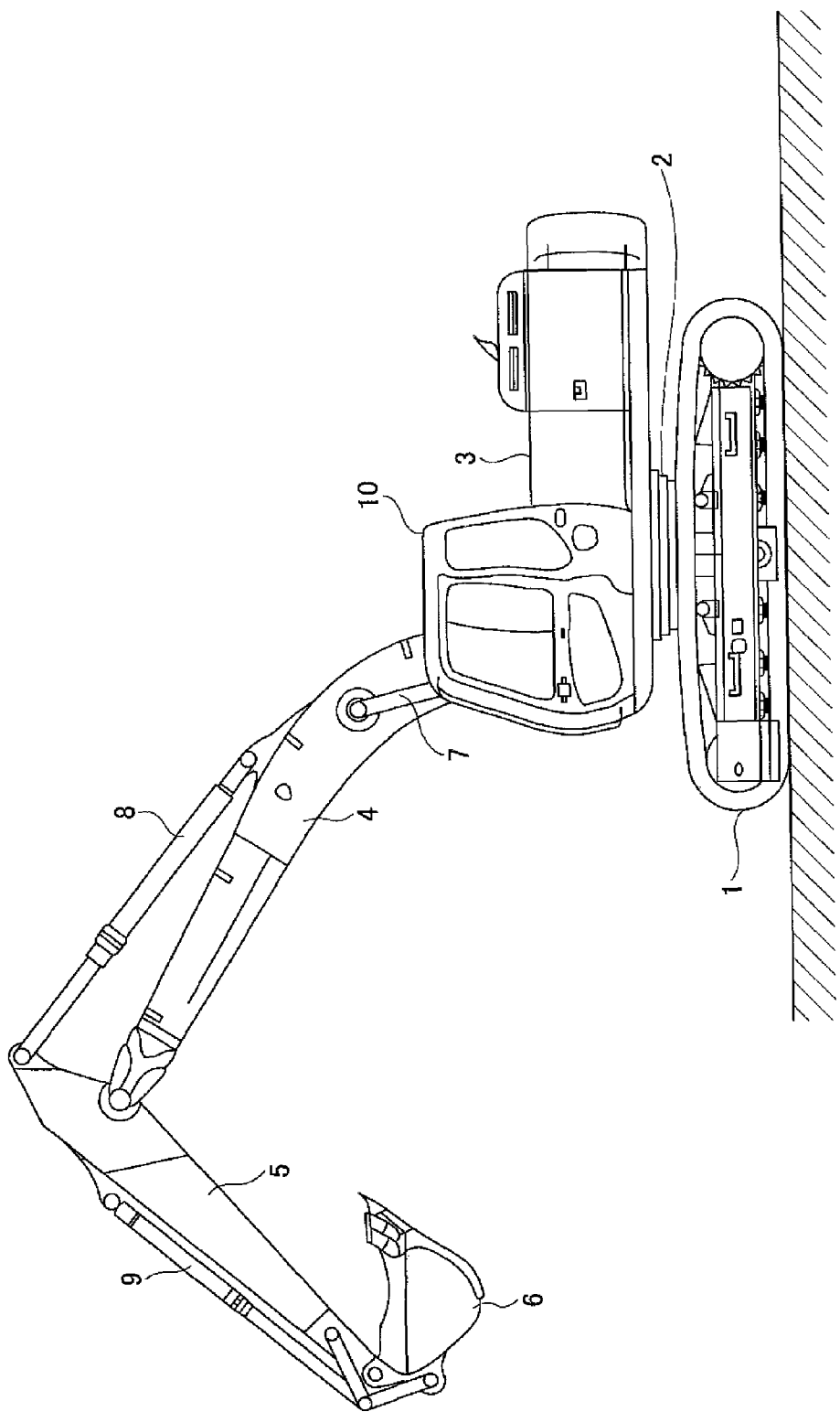
FIG. 1 is a side view of a hybrid shovel according to a first embodiment of the present invention.

FIG. 1 is a side view of a hybrid shovel, which is an example of a hybrid working machine according to a first embodiment of the present invention.

An upper-part turning body 3 is mounted through a turning mechanism 2 on a lower-part traveling body 1 of the hybrid shovel. A boom 4 is attached to the upper-part turning body 3. An arm 5 is attached to the end of the boom 4. A bucket 6 is attached to the end of the arm 5. The boom 4, the arm 5, and the bucket 6 are hydraulically driven by a boom cylinder 7, an arm cylinder 8, and a bucket cylinder 9, respectively. A cabin 10 and power sources such as an engine (not graphically illustrated) are mounted on the upper-part turning body 3.

Figure 2:
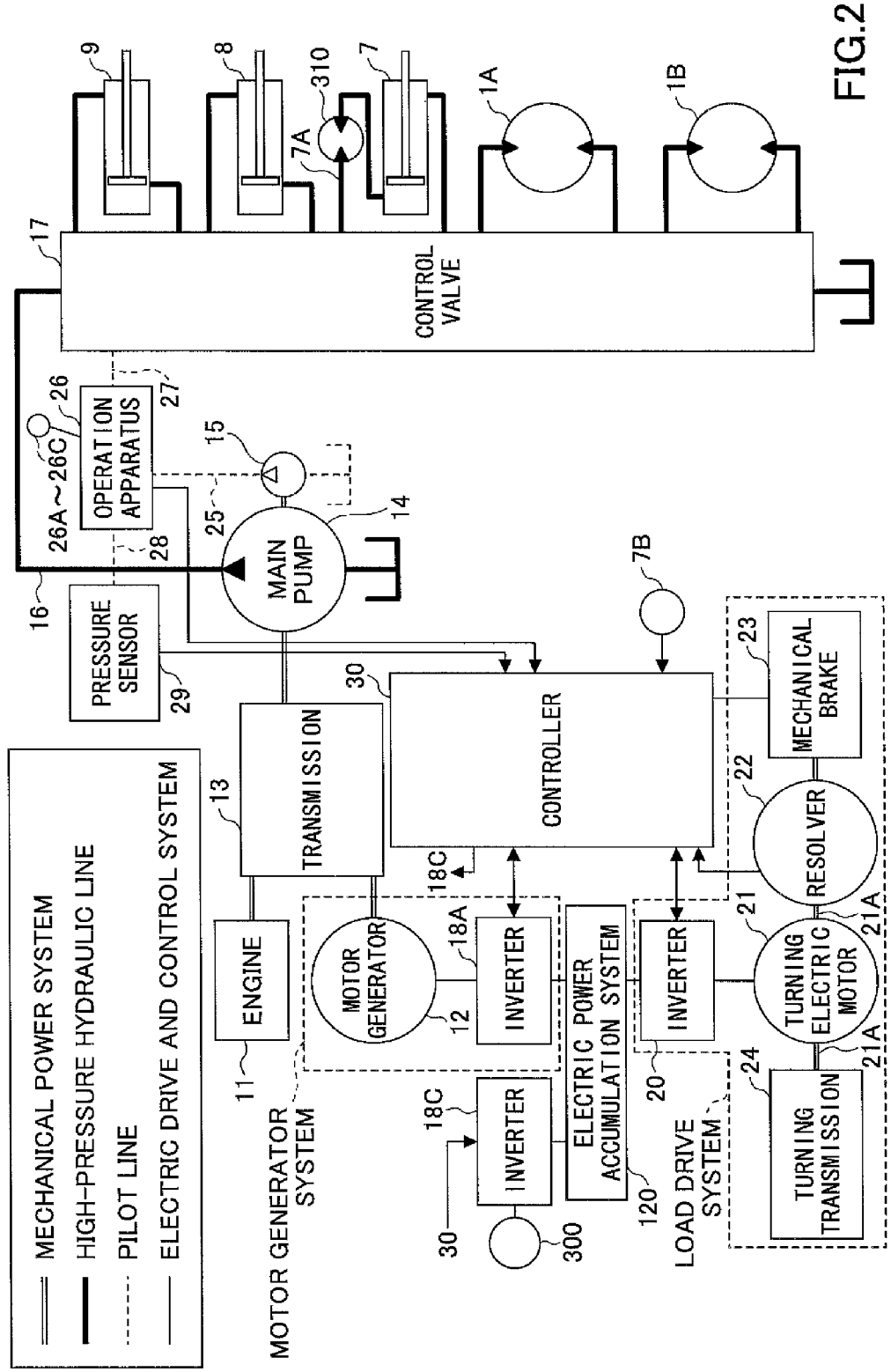
FIG. 2 is a block diagram illustrating a configuration of a drive system of the hybrid shovel according to the first embodiment.

FIG. 2 is a block diagram illustrating a configuration of a drive system of the hybrid shovel according to the first embodiment. In FIG. 2, a double line, a bold solid line, a broken line, and a fine solid line indicate a mechanical power system, a high-pressure hydraulic line, a pilot line, and an electric drive and control system, respectively.

An engine 11 as a mechanical drive part and a motor generator 12 as an assist drive part are connected to a first input shaft and a second input shaft, respectively, of a transmission 13. A main pump 14 and a pilot pump 15 are connected as hydraulic pumps to the output shaft of the transmission 13. A control valve 17 is connected to the main pump 14 via a high-pressure hydraulic line 16.

The control valve 17 is a controller configured to control a hydraulic system in the hybrid shovel. Hydraulic motors 1A (right) and 1B (left) for the lower-part traveling body 1, the boom cylinder 7, the arm cylinder 8, and the bucket cylinder 9 are connected to the control valve 17 via high-pressure hydraulic lines.

An electric power accumulation system 120 including a capacitor as an electric power accumulator is connected to the motor generator 12 via an inverter 18A. A turning electric motor 21 as an electric working element is connected to the electric power accumulation system 120 via an inverter 20. A resolver 22, a mechanical brake 23, and a turning transmission 24 are connected to a rotation shaft 21A of the turning electric motor 21. Further, an operation apparatus 26 is connected to the pilot pump 15 via a pilot line 25. The turning electric motor 21, the inverter 20, the resolver 22, the mechanical brake 23, and the turning transmission 24 constitute a load drive system.

The operation apparatus 26 includes a lever 26A, a lever 26B, and a pedal 26C. The lever 26A, the lever 26B, and the pedal 26C are connected to the control valve 17 and a pressure sensor 29 via hydraulic lines 27 and 28, respectively. The pressure sensor 29 is connected to a controller 30 that controls the driving of the electric system of the hybrid shovel.

According to this embodiment, a boom regeneration motor 300 (also referred to as "motor generator 300") for acquiring boom regenerated electric power is connected to the electric power accumulation system 120 via an inverter 18C. The motor generator 300 is driven by a hydraulic motor 310 driven with hydraulic fluid discharged from the boom cylinder 7. The motor generator 300 converts the potential energy of the boom 4 into electrical energy using the pressure of hydraulic fluid discharged from the boom cylinder 7 as the boom 4 is lowered in accordance with gravity. In FIG. 2, the hydraulic motor 310 and the motor generator 300 are illustrated at separate positions for convenience of description. Actually, however, the rotation shaft of the motor generator 300 is mechanically connected to the rotation shaft of the hydraulic motor 310.

That is, the hydraulic motor 310 is configured to rotate with hydraulic fluid discharged from the boom cylinder 7 when the boom 4 is lowered, and is provided to convert energy at the time of the boom 4 being lowered in accordance with gravity into a rotating force. The hydraulic motor 310 is provided in a hydraulic pipe 7A between the control valve 17 and the boom cylinder 7. The hydraulic motor 310 may be attached to an appropriate part in the upper-part turning body 3.

The electric power generated in the motor generator 300 is fed as regenerated electric power to the electric power accumulation system 120 via the inverter 18C. The motor generator 300 and the inverter 18C constitute a load drive system.

According to this embodiment, a boom angle sensor 7B for detecting the angle of the boom 4 is attached to the support shaft of the boom 4. The boom angle sensor 7B detects a boom angle θB and feeds the detected boom angle θB to the controller 30.

Figure 3:
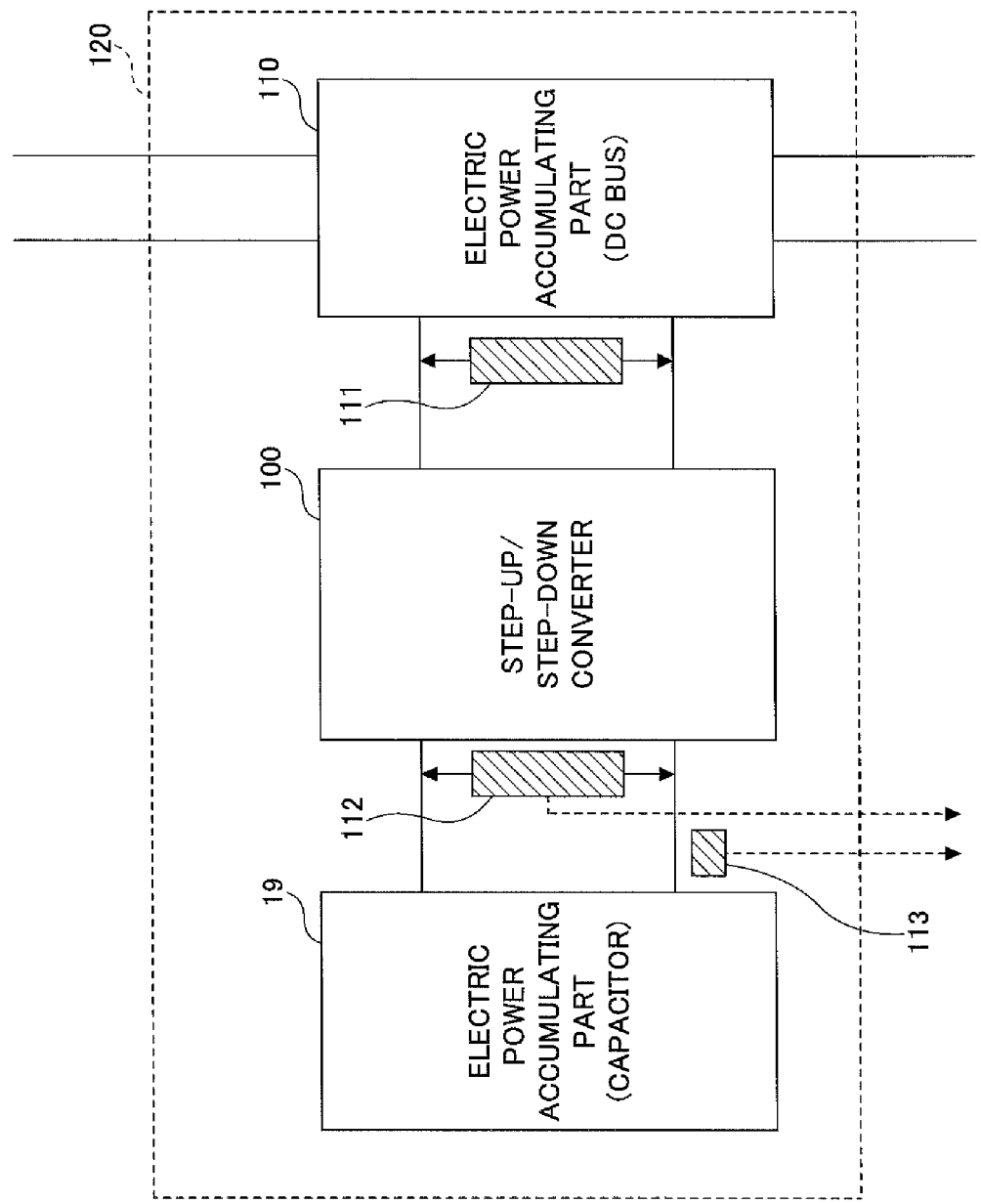
FIG. 3 is a block diagram illustrating a configuration of an electric power accumulation system according to the first embodiment.

FIG. 3 is a block diagram illustrating the electric power accumulation system 120. The electric power accumulation system 120 includes a capacitor 19 as an electric power accumulator, a step-up/step-down converter 100, and a DC bus 110. The DC bus 110 acting as a second electric power accumulator controls the transfer of electric power among the capacitor 19 acting as a first electric power accumulator, the motor generator 12, and the turning electric motor 21. The capacitor 19 is provided with a capacitor voltage detecting part 112 configured to detect a capacitor voltage value and a capacitor electric current detecting part 113 configured to detect a capacitor electric current value. The capacitor voltage value and the capacitor electric current value detected by the capacitor voltage detecting part 112 and the capacitor electric current detecting part 113, respectively, are fed to the controller 30.

The step-up/step-down converter 100 performs such control as switching a step-up operation and a step-down operation in accordance with the operating states of the motor generator 12, the motor generator 300, and the turning electric motor 21, so that the DC bus voltage value falls within a certain range. The DC bus 110 is provided between the step-up/step-down converter 100 and the inverters 18A, 18C, and 20 to transfer electric power among the capacitor 19, the motor generator 12, the motor generator 300, and the turning electric motor 21.

Referring back to FIG. 2, the controller 30 is a control unit as a main control part to control the driving of the hybrid shovel. The controller 30 includes a processor including a central processing unit (CPU) and an internal memory. The controller 30 is implemented by the CPU executing a drive control program contained in the internal memory.

The controller 30 converts a signal fed from the pressure sensor 29 into a speed command, and controls the driving of the turning electric motor 21. The signal fed from the pressure sensor 29 corresponds to a signal representing the amount of operation in the case of operating the operation apparatus 26 to turn the turning mechanism 2.

The controller 30 controls the operation (switches the electric motor [assist] operation and the generator operation) of the motor generator 12. The controller 30 also controls the charge and discharge of the capacitor 19 by controlling the driving of the step-up/step-down converter 100 as a step-up/step-down control part. The controller 30 controls the charge and discharge of the capacitor 19 by controlling the switching of the step-up operation and the step-down operation of the step-up/step-down converter 100 based on the state of charge of the capacitor 19, the operating state (electric motor [assist] operation or generator operation) of the motor generator 12, and the operating state (power running operation or regenerative operation) of the turning electric motor 21.

This control of the switching of the step-up operation and the step-down operation of the step-up/step-down converter 100 is performed based on the DC bus voltage value detected by a DC bus voltage detecting part 111, the capacitor voltage value detected by the capacitor voltage detecting part 112, and the capacitor electric current value detected by the capacitor electric current detecting part 113.

In the above-described configuration, the electric power generated by the motor generator 12, which is an assist motor, is fed to the DC bus 110 of the electric power accumulation system 120 via the inverter 18A to be fed to the capacitor 19 via the step-up/step-down converter 100. The electric power regenerated by the regenerative operation of the turning electric motor 21 is fed to the DC bus 110 of the electric power accumulation system 120 via the inverter 20 to be fed to the capacitor 19 via the step-up/step-down converter 100. Further, the electric power generated by the motor generator 300 for boom regeneration is fed to the DC bus 110 of the electric power accumulation system 120 via the inverter 18C to be fed to the capacitor 19 via the step-up/step-down converter 100.

The rotational speed (angular velocity ω) of the turning electric motor 21 is detected by the resolver 22. Further, the angle of the boom 4 (boom angle θB) is detected by the boom angle sensor 7B such as a rotary encoder provided on the support shaft of the boom 4.

According to this embodiment, when the electric discharge of the capacitor 19 is necessary, the electric power from the capacitor 19 is consumed by driving the hydraulic motor 310 by feeding electric power from the capacitor 19 to the boom regeneration motor (motor generator) 300. As a result, electric discharge is performed by reducing the voltage of the capacitor 19 to a predetermined low voltage.

Figure 4:
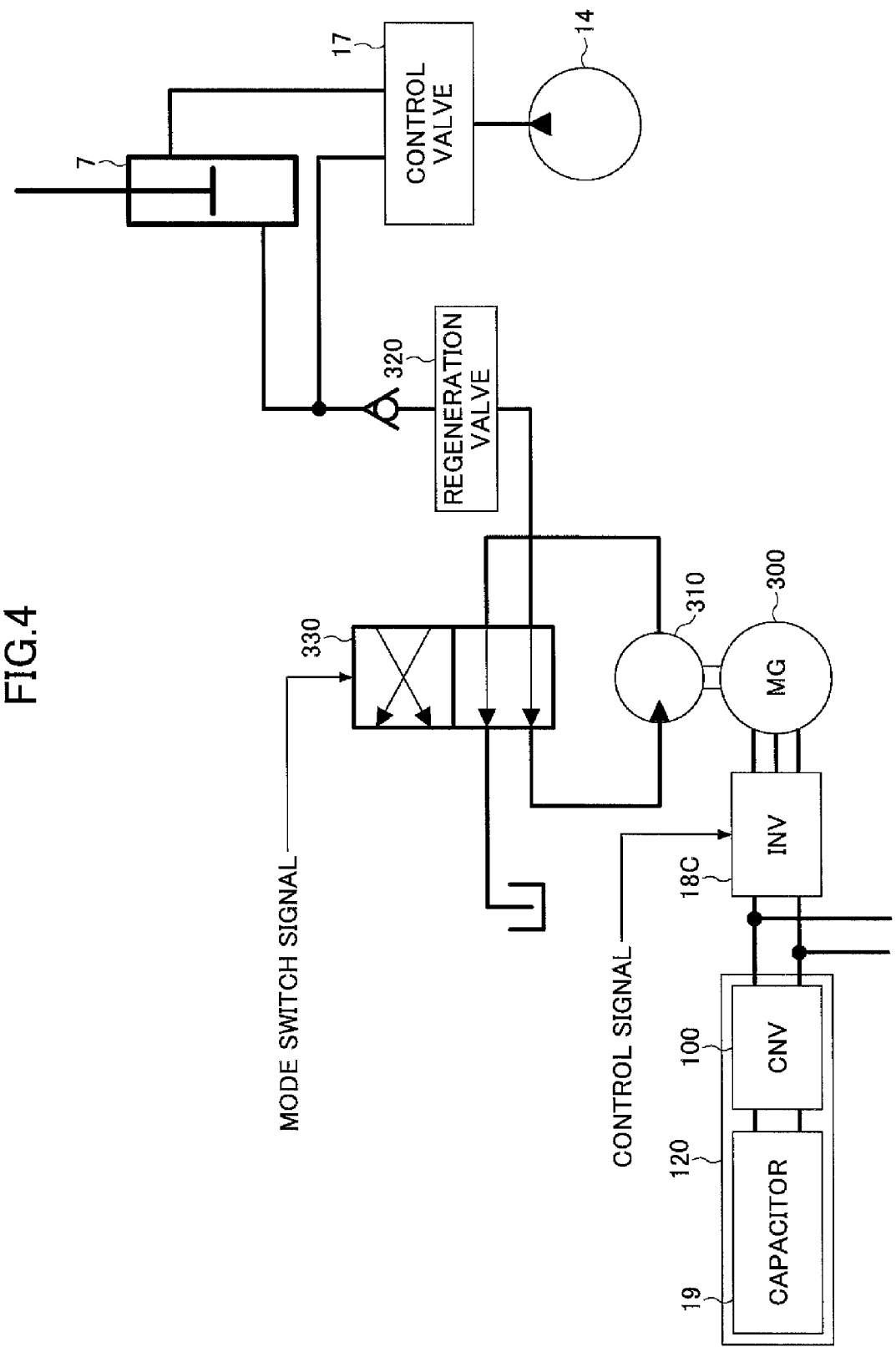
FIG. 4 is a circuit diagram of the electric power accumulation system according to the first embodiment.

FIG. 4 is a diagram illustrating a hydraulic circuit for performing electric discharge. At the time of performing electric discharge, first, a control signal for driving the boom regeneration motor 300 for electric discharge is transmitted from the controller 30 to the inverter 18C. In response to receiving the control signal, the inverter 18C feeds the boom regeneration motor 300 with the electric power of the capacitor 19 fed from the electric power accumulation system 120. This drives the boom regeneration motor 300, so that the hydraulic motor 310 is caused to rotate by a driving force.

Here, in the case of performing electric discharge, the motor generator 300 operates as an electric motor, and the hydraulic motor 310 for boom regeneration corresponds to a hydraulic load driven by the motor generator 300. Naturally, no regeneration is performed by the boom regeneration hydraulic motor 310 in the case of performing electric discharge. Accordingly, in performing electric discharge, the control valve 17 is closed, and a regeneration valve 320 also is closed. With the regeneration valve 320 being closed, no hydraulic fluid is fed to the boom regeneration hydraulic motor 310. Accordingly, at the time of performing electric discharge, the controller 30 transmits a mode switch signal to a selector valve 330, thereby driving the selector valve 330 to switch the hydraulic circuit. That is, the selector valve 330 is driven to connect the hydraulic feed port and the hydraulic discharge port of the boom regeneration hydraulic motor 310 with a closed loop circuit.

Accordingly, when the selector valve 330 is switched, the hydraulic fluid fed to the hydraulic feed port of the boom regeneration hydraulic motor 310 is discharged from the hydraulic discharge port, so that the discharged hydraulic fluid returns to the hydraulic feed port. As a result, the boom regeneration hydraulic motor 310 runs idle. Even in the state of idle running, power for causing hydraulic fluid to flow is necessary. This power corresponds to the driving force of the motor generator 300.

Thus, the boom regeneration hydraulic motor 310 is caused to run idle with electric power fed from the capacitor 19 to the motor generator 300. As a result, the electric power from the capacitor 19 is consumed, so that the voltage of the capacitor 19 is reduced. When the voltage of the capacitor 19 reaches a preset voltage, the electric discharge is completed, so that the feeding of electric power to the motor generator 300 is stopped and the idle running of the boom regeneration hydraulic motor 310 is stopped.

The motor generator 300 and the boom regeneration hydraulic motor 310 form a drive system separate from the drive system including the engine 11. It is possible to drive the motor generator 300 and the boom regeneration hydraulic motor 310 even when the engine 11 is not in operation (that is, stopped). Accordingly, it is possible to perform electric discharge after stopping the engine 11, and it is also possible to perform electric discharge while the engine 11 is running idle.

Figure 5:
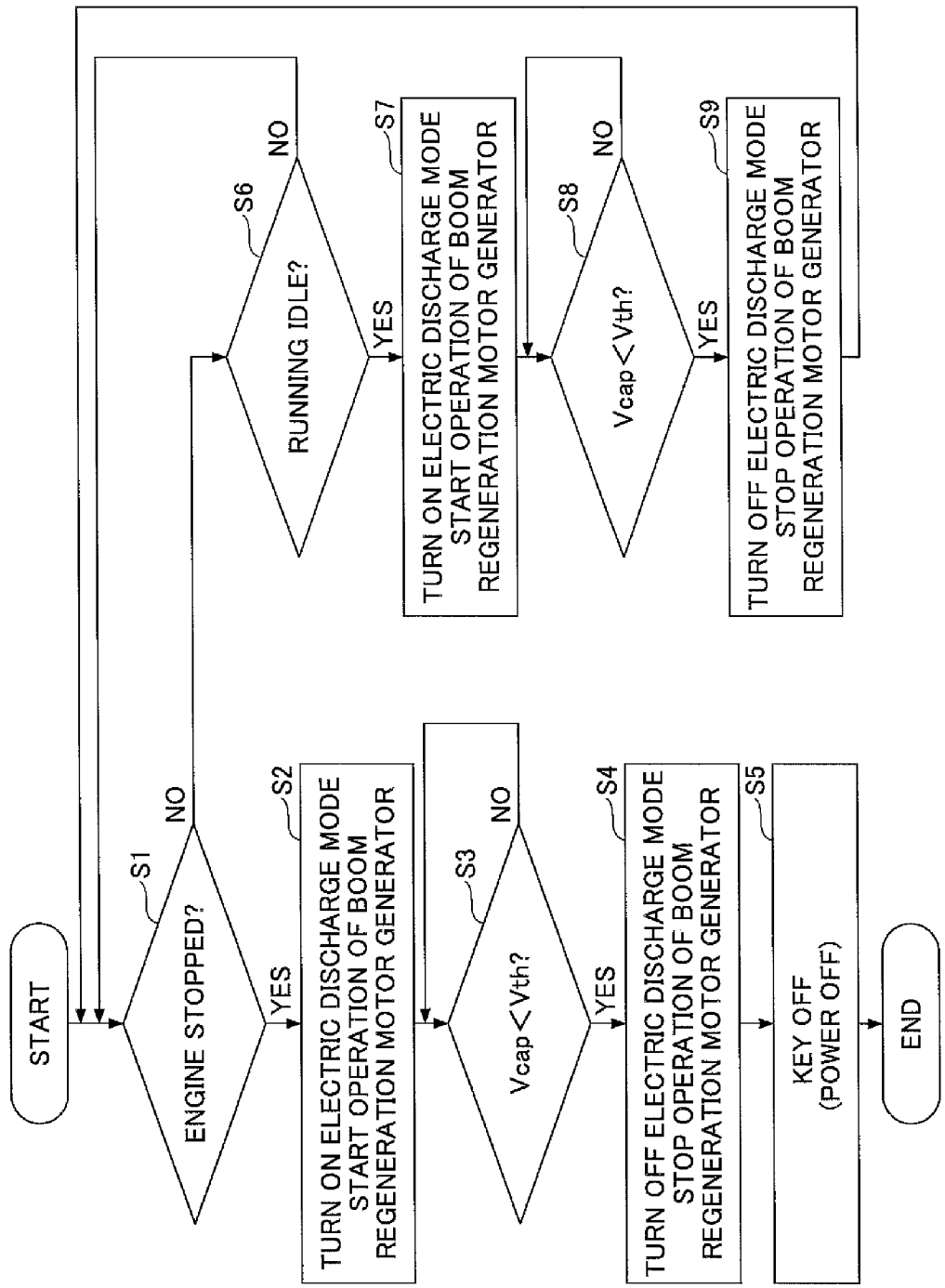
FIG. 5 is a flowchart of an electric discharge operation according to the first embodiment.

Here, a description is given, with reference to the flowchart of FIG. 5 as well as FIG. 4, of an electric discharge operation. When the electric discharge operation is started, first, in step S1, it is determined whether the engine 11 is stopped. If it is determined that the engine 11 is stopped (YES in step S1), the operation proceeds to step S2. In step S2, an electric discharge mode is turned ON. First, a mode switch signal is fed to the selector valve 330, so that the selector valve 330 is switched to the electric discharge mode (from OFF to ON of the electric discharge mode). At this point, the boom regeneration hydraulic motor 310 is performing no hydraulic regeneration. Therefore, the regeneration valve 320 is closed. After the selector valve 330 is switched to the electric discharge mode, a control signal is fed to the inverter 18C. As a result, the inverter 18C feeds electric power from the capacitor 19 to the motor generator 300, so that the motor generator 300 is driven. The boom regeneration hydraulic motor 310 is driven with the driving of the motor generator 300, so that the motor generator 300 consumes electric power. This electric power is fed from the capacitor 19. As a result of this discharge, the voltage of the capacitor 19 drops.

Next, in step S3, it is determined whether the voltage Vcap of the capacitor 19 is lower than a preset capacitor target voltage (threshold) Vth. If the voltage Vcap of the capacitor 19 is higher than or equal to the preset capacitor target voltage (threshold) Vth (NO in step S3), the determination of step S3 is repeatedly performed. On the other hand, if the voltage Vcap of the capacitor 19 is lower than a preset capacitor target voltage (threshold) Vth (YES in step S3), the operation proceeds to step S4, where the electric discharge mode is turned OFF. As a result, the feeding of electric power to the motor generator 300 is stopped, and the boom regeneration hydraulic motor 310 is stopped, so that electric discharge is completed. Therefore, in step S5, the construction machine (hybrid shovel) is turned OFF (the main switch of the construction machine is turned OFF) to end the electric discharge operation. Thus, when the power is turned OFF, the transmission of control signals to converters and inverters is stopped.

On the other hand, if it is determined in step S1 that the engine 11 is not stopped (NO in step S1), the operation proceeds to step S6. In step S6, it is determined whether the engine 11 is running idle. If it is determined that the engine 11 is not running idle (NO in step S6), the operation returns to step S1, and the electric discharge operation is repeated from the beginning. If it is determined in step S6 that the engine 11 is running idle, the operation proceeds to step S7. The operation of step S7 through step S9 is the same as the operation of step S2 through step S4.

The idle running refers to the operating state of the engine 11 at the time when no load is applied on the main pump 14. Further, the idle running may refer to the operating state of the engine 11 at the time when the engine 11 is running at an idling engine speed lower than an operating engine speed with no load applied on the main pump 14.

That is, in step S7, an electric discharge mode is turned ON. First, a mode switch signal is fed to the selector valve 330, so that the selector valve 330 is switched to the electric discharge mode. At this point, the boom regeneration hydraulic motor 310 is performing no hydraulic regeneration. Therefore, the regeneration valve 320 is closed. After the selector valve 330 is switched to the electric discharge mode, a control signal is fed to the inverter 18C. As a result, the inverter 18C feeds electric power from the capacitor 19 to the motor generator 300, so that the motor generator 300 is driven. The boom regeneration hydraulic motor 310 is driven with the driving of the motor generator 300, so that the motor generator 300 consumes electric power. This electric power is fed from the capacitor 19. As a result of this discharge, the voltage of the capacitor 19 drops.

Next, in step S8, it is determined whether the voltage Vcap of the capacitor 19 is lower than a preset capacitor target voltage (threshold) Vth. If the voltage Vcap of the capacitor 19 is higher than or equal to the preset capacitor target voltage (threshold) Vth (NO in step S8), the determination of step S8 is repeatedly performed. On the other hand, if the voltage Vcap of the capacitor 19 is lower than a preset capacitor target voltage (threshold) Vth (YES in step S8), the operation proceeds to step S9, where the electric discharge mode is turned OFF. As a result, the feeding of electric power to the motor generator 300 is stopped, and the boom regeneration hydraulic motor 310 is stopped, so that electric discharge is completed. When the electric discharge during idle running is completed in step S9, the operation returns to step S1. As a result of returning to step S1, it is determined whether the idle running is stopped and the engine 11 is stopped. Therefore, the electric discharge at the time when the engine 11 is stopped may be performed next.

In the above-described electric discharge operation, electric discharge is performed by causing the boom regeneration motor generator 300 to perform power running even during the idle running of the engine 11. Alternatively, during the idle running of the engine 11, electric discharge may be performed using the motor generator 12, which is an assist motor.

Figure 6:
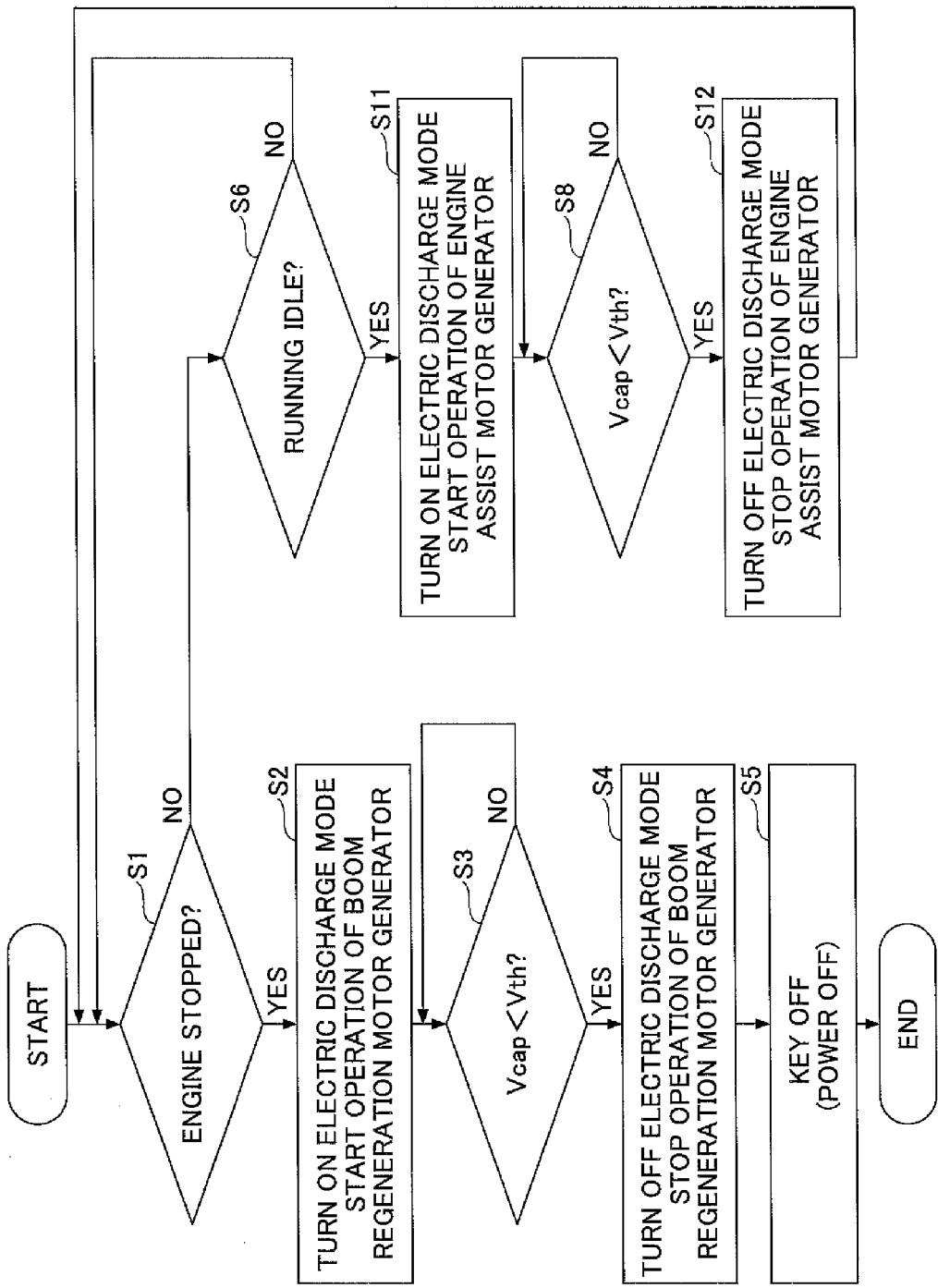
FIG. 6 is a flowchart of another electric discharge operation according to the first embodiment.

Here, a description is given, with reference to FIG. 6, of an electric discharge operation using the motor generator 12. In FIG. 6, the same steps as those illustrated in FIG. 5 are referred to by the same step numbers, and a description thereof is suitably omitted.

The electric discharge operation illustrated in FIG. 6 is different from the electric discharge operation illustrated in FIG. 5, in that the electric discharge during the idle running of the engine 11 is performed in step S11 of FIG. 6 instead of step S7 of FIG. 5. In step S7, electric discharge is performed by driving the boom regeneration motor generator 300 while in step S11, electric discharge is performed by driving the motor generator 12, which is an assist motor directly connected to the engine 11. When the engine 11 is running idle, the motor generator 12 also is rotating. Therefore, it is possible to consume electric power by assisting the idle running of the engine 11 by causing the motor generator 12 to perform power running.

Accordingly, in the electric discharge operation illustrated in FIG. 6, if it is determined in step S6 that the engine 11 is running idle, the operation proceeds to step S11. In step S11, an electric discharge mode is turned ON, and first, a control signal is fed to the inverter 18A. As a result, the inverter 18A feeds electric power from the capacitor 19 to the motor generator 12, so that the motor generator 12 is driven. The idle running of the engine 11 is assisted with the driving of the motor generator 12. The motor generator 12 consumes electric power fed from the capacitor 19 by this assisting, so that the voltage of the capacitor 19 drops.

By thus performing electric discharge using the motor generator 12, it is possible to not only consume electric power from the capacitor 19, but also assist the idle running of the engine 11. The output of the engine 11 may be reduced by the amount of assisting, so that it is possible to reduce the amount of fuel consumption during the idle running.

Next, in step S8, it is determined whether the voltage Vcap of the capacitor 19 is lower than a preset capacitor target voltage (threshold) Vth. If the voltage Vcap of the capacitor 19 is higher than or equal to the preset capacitor target voltage (threshold) Vth (NO in step S8), the determination of step S8 is repeatedly performed. On the other hand, if the voltage Vcap of the capacitor 19 is lower than a preset capacitor target voltage (threshold) Vth (YES in step S8), the operation proceeds to step S12, where the electric discharge mode is turned OFF. As a result, the feeding of electric power to the motor generator 12 is stopped, and the motor generator 12 stops power running, so that electric discharge is completed. When the electric discharge during idle running is completed in step S12, the operation returns to step S1.

Figure 7:
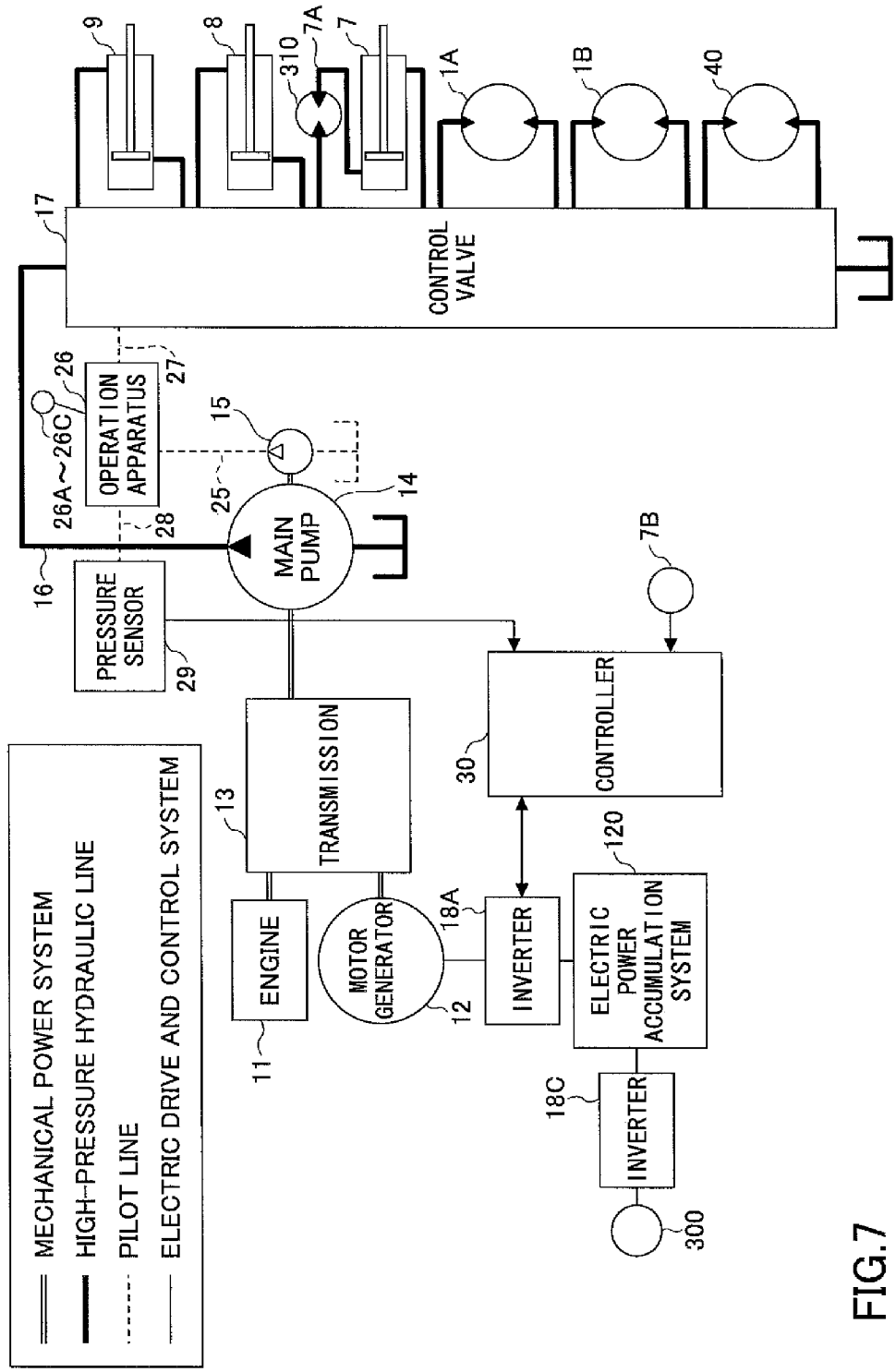
FIG. 7 is a block diagram illustrating a configuration of a drive system of a hybrid shovel having a turning mechanism driven by a turning hydraulic motor according to the first embodiment.

In the above-described embodiment, the turning electric motor 21 is used a drive source for driving the turning mechanism. Alternatively, as illustrated in FIG. 7, the turning mechanism 2 may be driven by a turning hydraulic motor 40. That is, in the configuration illustrated in FIG. 7, the turning hydraulic motor 40 connected to the control valve 17 is provided in place of the load drive system including the turning electric motor 21 illustrated in FIG. 2, and each drive part is hydraulically operated. The present invention may also be applied to a hybrid shovel having such a configuration. In FIG. 7, the same components as those illustrated in FIG. 2 are referred to by the same reference numerals, and a description thereof is omitted.

In the hybrid shovel configured as illustrated in FIG. 7, the electric power generated in the motor generator 12 with the excess output of the engine 11 and the electric power generated by the boom regeneration motor generator 300 are accumulated (stored) in the electric power accumulation system 120. The electric power accumulated in the electric power accumulation system 120 is used to assist the engine 11 in generating output.

Figure 8:
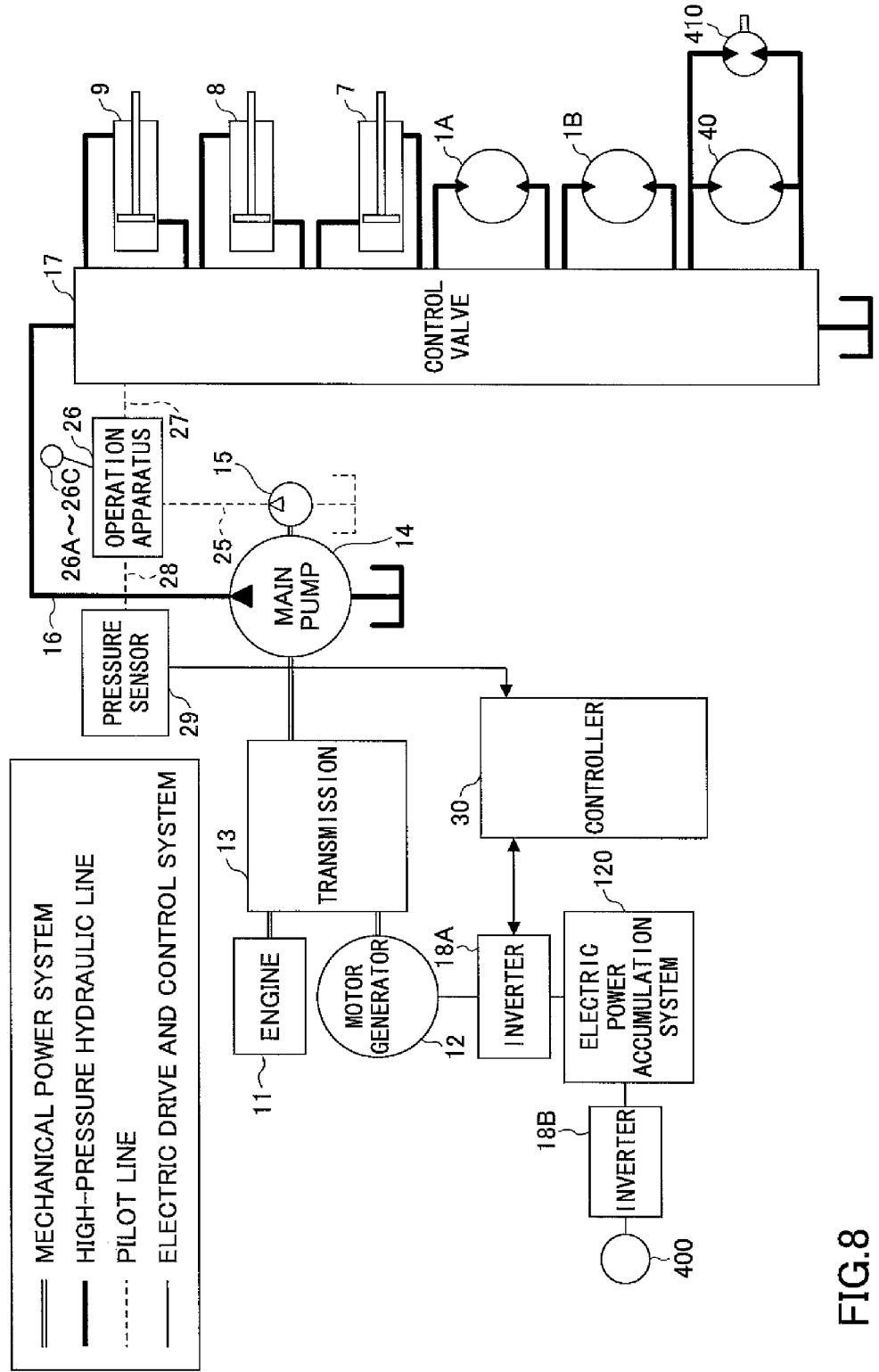
FIG. 8 is a block diagram illustrating a configuration of a drive system of a hybrid shovel according to a second embodiment of the present invention.

Further, the present invention may also be applied to a configuration where a turning hydraulic regeneration mechanism is provided that regenerates electric power when the turning hydraulic motor 40 is decelerated. FIG. 8 is a block diagram illustrating a configuration of a drive system of a hybrid shovel according to a second embodiment of the present invention. The hybrid shovel of the second embodiment may have the same components as those illustrated in FIG. 1. In FIG. 8, the same components as those illustrated in FIG. 7 are referred to by the same reference numerals, and a description thereof is omitted.

The turning hydraulic regeneration mechanism includes a hydraulic motor 410 for turning regeneration and a motor generator (motor for turning regeneration) 400 driven by the turning regeneration hydraulic motor 410. The turning regeneration hydraulic motor 410 may be driven with hydraulic fluid discharged from the turning hydraulic motor 40. The motor generator 400 is connected to the electric power accumulation system 120 via an inverter 18B. The electric power regenerated by the motor generator 400 is fed from the inverter 18B to the electric power accumulation system 120. Further, the motor generator 400 operates as an electric motor driven with electric power fed from the inverter 18B. When the motor generator 400 performs power running, the turning regeneration hydraulic motor 410 is driven. The hydraulic circuit of the turning regeneration hydraulic motor 410 is provided with a selector valve having the same function as the above-described selector valve 330 (FIG. 4). When the selector valve is set to an electric discharge mode, the selector valve disconnects the turning regeneration hydraulic motor 410 from a tank to form a circulation circuit, thereby making it possible to cause the turning regeneration hydraulic motor 410 to run idle.

Like the motor generator 300 in the above-described first embodiment, the motor generator 400 in this embodiment may be used for electric discharge. That is, when an electric discharge mode is turned ON, the turning regeneration hydraulic motor 410 is allowed to run idle, and electric power is fed from the capacitor 19 to the motor generator 400 via the inverter 18B. As a result, the motor generator 400 performs power running to drive the turning regeneration hydraulic motor 410, so that the electric power of the capacitor 19 is consumed, thus making it possible to reduce the voltage of the capacitor 19.

Figure 9:
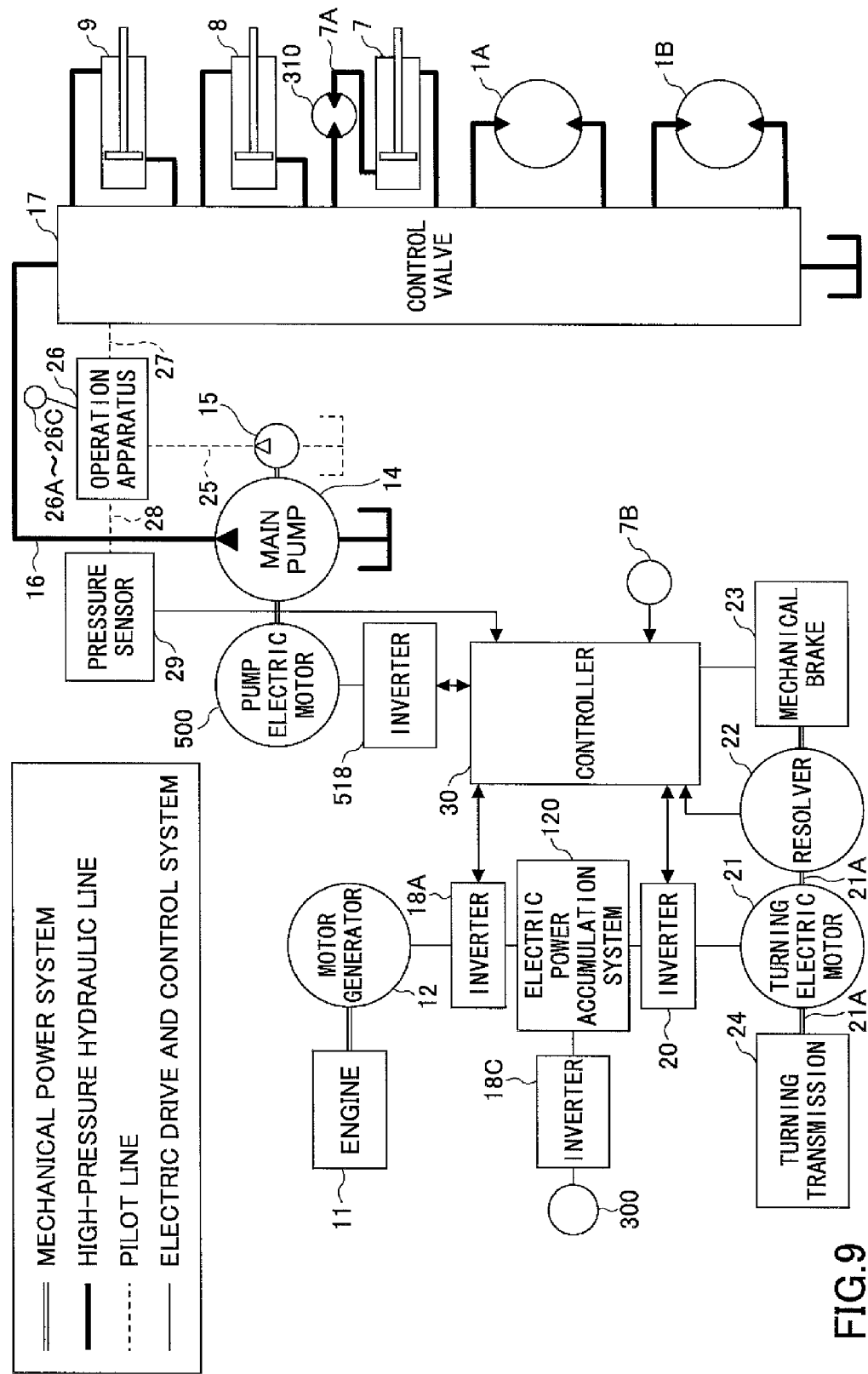
FIG. 9 is a block diagram illustrating a configuration of a drive system of a series hybrid shovel according to a third embodiment of the present invention.

In the above-described embodiments, a description is given of a case where the present invention is applied to a so-called parallel hybrid shovel, where the engine 11 and the motor generator 12 are connected to the main pump 14, which is a hydraulic pump, to drive the main pump 14. Alternatively, the present invention may also be applied to a so-called series hybrid shovel. FIG. 9 is a block diagram illustrating a configuration of a drive system of a series hybrid shovel according to a third embodiment of the present invention. As illustrated in FIG. 9, according to the third embodiment, the motor generator 12 is driven by the engine 11, the electric power generated by the motor generator 12 is accumulated (stored) in the electric power accumulation system 120, and the main pump 14 is driven by driving a pump electric motor 500 (connected to the controller 30 via an inverter 518) only with the accumulated electric power. In this case, the motor generator 12 has a function as a generator that performs only a generator operation by being driven by the engine 11 in this embodiment.

In the above-described embodiments, the boom regeneration motor (motor generator) 300 or the turning regeneration motor (motor generator) 400 is used as an electric motor used for electric discharge. This is because using an existing motor generator eliminates the necessity of newly providing an electric motor for electric discharge. However, an electric motor dedicated for electric discharge may be newly provided. In this case, a hydraulic motor for electric discharge is connected to a hydraulic circuit, and an electric motor for electric discharge is connected to this hydraulic motor for electric discharge. Since an electric motor dedicated for electric discharge is newly provided, the electric motor for electric discharge will do if it has a function as an electric motor, and does not have to be a motor generator.

Working machines according to aspects of the present invention are not limited to the above-described embodiments, and there may be other variations. For example, a hybrid shovel is taken as an example of the working machine in the above-described embodiments. However, the present invention may be applied to other working machines such as wheel loaders, bulldozers, and cranes as well.

According to an aspect of the present invention, an electric power accumulator is subjected to electric discharge by driving an electric motor for electric discharge. Therefore, only the electric motor for electric discharge and a hydraulic motor for electric discharge are driven, so that electric discharge may be made even when an engine is stopped. Further, a motor generator for boom regeneration or a motor generator for turning regeneration, which has a relatively large capacity, is used as the motor generator for electric discharge. This allows electric power released from the electric power accumulator for electric discharge to be consumed in a short period of time.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. A hybrid working machine, comprising:
an engine;
an assist motor configured to assist the engine;
a hydraulic pump driven by the engine;
an electric power accumulating unit configured to feed the assist motor with electric power;
an electric-discharge electric motor configured to perform power running with electric power of an electric power accumulator of the electric power accumulating unit;
an electric-discharge hydraulic motor connected to the electric-discharge electric motor; and
a hydraulic circuit configured to control driving of the electric-discharge hydraulic motor,
the hydraulic circuit including
a circulation circuit configured to be connected to a hydraulic feed port and a hydraulic discharge port of the electric-discharge hydraulic motor; and
a selector valve configured to perform such switching as to connect the electric-discharge hydraulic motor to the circulation circuit at a time of performing an electric discharge operation.

2. The hybrid working machine as claimed in claim 1, wherein the electric-discharge electric motor is configured to perform power running in accordance with an operation of the selector valve.

3. The hybrid working machine as claimed in claim 2, wherein the electric-discharge electric motor is configured to perform the power running at an end of an operation of the hybrid working machine.

4. The hybrid working machine as claimed in claim 3, wherein the assist motor is configured to perform power running to consume the electric power from the electric power accumulating unit during idle running of the engine.

5. The hybrid working machine as claimed in claim 3, wherein the electric-discharge electric motor is configured to perform the power running to consume the electric power from the electric power accumulator of the electric power accumulating unit during idle running of the engine.

6. The hybrid working machine as claimed in claim 1, wherein the electric-discharge hydraulic motor is a boom regeneration hydraulic motor, and the electric-discharge electric motor is a boom regeneration motor generator mechanically connected to the boom regeneration hydraulic motor.

7. The hybrid working machine as claimed in claim 1, wherein the electric-discharge hydraulic motor is a turning regeneration hydraulic motor, and the electric-discharge electric motor is a turning regeneration motor generator mechanically connected to the turning regeneration hydraulic motor.

* * * * *